United States Patent
Chien et al.

(10) Patent No.: US 12,474,477 B2
(45) Date of Patent: Nov. 18, 2025

(54) SENSOR-BASED INFRASTRUCTURE CONDITION MONITORING

(71) Applicant: AT&T Intellectual Property I, L.P., Atlanta, GA (US)

(72) Inventors: Ginger Chien, Bellevue, WA (US); Zhi Cui, Sugar Hill, GA (US); Eric Zavesky, Austin, TX (US); Robert T. Moton, Jr., Alpharetta, GA (US); Adrianne Binh Luu, Atlanta, GA (US); Robert Koch, Peachtree Corners, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1072 days.

(21) Appl. No.: 17/500,334

(22) Filed: Oct. 13, 2021

(65) Prior Publication Data

US 2023/0110269 A1    Apr. 13, 2023

(51) Int. Cl.
    *G01S 17/931*    (2020.01)
    *G01S 17/89*     (2020.01)
    (Continued)

(52) U.S. Cl.
    CPC ............ *G01S 17/931* (2020.01); *G01S 17/89* (2013.01); *G06T 7/97* (2017.01);
    (Continued)

(58) Field of Classification Search
    CPC ......... G01S 17/931; G01S 17/89; G06T 7/97; G06T 2207/20081; G06T 2207/20084;
    (Continued)

(56) References Cited

U.S. PATENT DOCUMENTS

| | | | |
|---|---|---|---|
| 12,038,752 B1 * | 7/2024 | Blanton | G05D 1/0088 |
| 2019/0043355 A1 * | 2/2019 | Ferguson | G05D 1/0088 |

(Continued)

FOREIGN PATENT DOCUMENTS

WO     WO-2009035697 A1 *   3/2009         G06K 9/00818

OTHER PUBLICATIONS

Haroun, F.M.E, et al., "A Review of Vegetation Encroachment Detection in Power Transmission Lines using Optical Sensing Satellite Imagery", 2010, downloaded from https://arxiv.org/ftp/arxiv/papers/2010/2010.01757.pdf on Sep. 21, 2021, 7 pages.

Musci, M. A., et al., "Ice Detection on Aircraft Surface Using Machine Learning Approaches Based on Hyperspectral and Multispectral Images", Drones 2020, 4, 45; doi:10.3390/drones4030045, Aug. 18, 2020.

(Continued)

*Primary Examiner* — Aaron W Carter
*Assistant Examiner* — Kyla Guan-Ping Tiao Allen

(57) ABSTRACT

A processing system including at least one processor may gather first imaging data associated with an infrastructure item via at least a first imaging device, where the first imaging data represents a first condition of the infrastructure item, and gather second imaging data associated with the infrastructure item via at least a second imaging device, where at least one of the at least the first imaging device or the at least the second imaging device is mounted on a vehicle, and where the infrastructure item is visible from a road on which the vehicle operates. The processing system may then determine a second condition of the infrastructure item in accordance with the second imaging data, where the second condition comprises a potentially unsafe condition of the infrastructure item, and generate a report of the potentially unsafe condition of the infrastructure item in response to the determining.

20 Claims, 4 Drawing Sheets

(51) Int. Cl.
*G06T 7/00* (2017.01)
*G06T 7/73* (2017.01)
(52) U.S. Cl.
CPC ............... *G06T 2207/20081* (2013.01); *G06T 2207/20084* (2013.01); *G06T 2207/30261* (2013.01)
(58) Field of Classification Search
CPC ... G06T 2207/30261; G06T 7/00; G06T 7/74; G06T 7/75; G06T 2207/10016; G06T 2207/10024; G06T 2207/10028; G06T 2207/10032; G06T 2207/10048; G06T 2207/20072; G06T 2207/30252; G06T 2207/30256
See application file for complete search history.

(56) References Cited

U.S. PATENT DOCUMENTS

| | | | |
|---|---|---|---|
| 2019/0188521 A1* | 6/2019 | Barzelay | G06T 17/00 |
| 2020/0074639 A1* | 3/2020 | Zhao | G06T 7/40 |
| 2020/0156592 A1* | 5/2020 | Zaharia | B60R 25/104 |
| 2020/0160626 A1* | 5/2020 | Lei | G08G 1/0112 |
| 2021/0027622 A1* | 1/2021 | Jiao | G08G 1/0112 |
| 2021/0049363 A1* | 2/2021 | Freitas Cunha | G06V 20/39 |
| 2022/0254004 A1* | 8/2022 | Shayne | H04N 7/188 |

OTHER PUBLICATIONS

Shihavuddin, Asm, et al., "Wind Turbine Surface Damage Detection by Deep Learning Aided Drone Inspection Analysis", Energies 2019, 12, 676; doi:10.3390/en12040676, Feb. 20, 2019, 16 pages.

\* cited by examiner

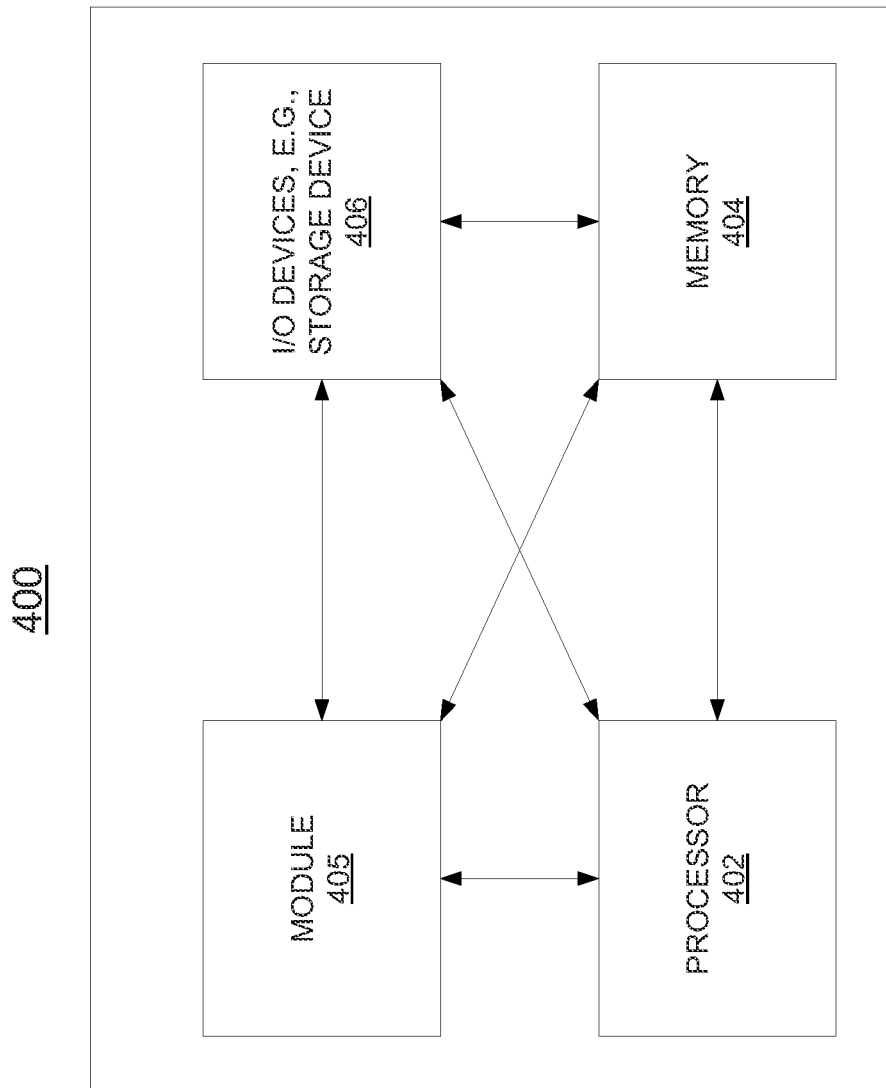

SENSOR-BASED INFRASTRUCTURE CONDITION MONITORING

The present disclosure relates to network-connected sensors, and more particularly to methods, computer-readable media, and apparatuses for determining an unsafe condition of an infrastructure item in accordance with imaging data obtained from imaging devices, where at least one imaging device is deployed in a vehicle and where the infrastructure item is visible from a road on which the vehicle operates.

BACKGROUND

Current trends in wireless technology are leading towards a future where virtually any object can be network-enabled and addressable on-network. The pervasive presence of cellular and non-cellular wireless networks, including fixed, ad-hoc, and/or or peer-to-peer wireless networks, satellite networks, and the like along with the migration to a 128-bit IPv6-based address space provides the tools and resources for the paradigm of the Internet of Things (IoT) to become a reality.

SUMMARY

In one example, the present disclosure describes a method, computer-readable medium, and apparatus for determining an unsafe condition of an infrastructure item in accordance with imaging data obtained from imaging devices, where at least one imaging device is deployed in a vehicle and where the infrastructure item is visible from a road on which the vehicle operates. For instance, a processing system including at least one processor may gather first imaging data associated with an infrastructure item via at least a first imaging device, where the first imaging data represents a first condition of the infrastructure item, and gather second imaging data associated with the infrastructure item via at least a second imaging device, where at least one of the at least the first imaging device or the at least the second imaging device is mounted on a vehicle, and where the infrastructure item is visible from a road on which the vehicle operates. The processing system may then determine a second condition of the infrastructure item in accordance with the second imaging data, where the second condition comprises a potentially unsafe condition of the infrastructure item, and generate a report of the potentially unsafe condition of the infrastructure item in response to the determining.

BRIEF DESCRIPTION OF THE DRAWINGS

The teachings of the present disclosure can be readily understood by considering the following detailed description in conjunction with the accompanying drawings, in which:

FIG. 4 illustrates a high-level block diagram of a computing device specially programmed to perform the functions described herein.

To facilitate understanding, identical reference numerals have been used, where possible, to designate identical elements that are common to the figures.

DETAILED DESCRIPTION

Figure 1:
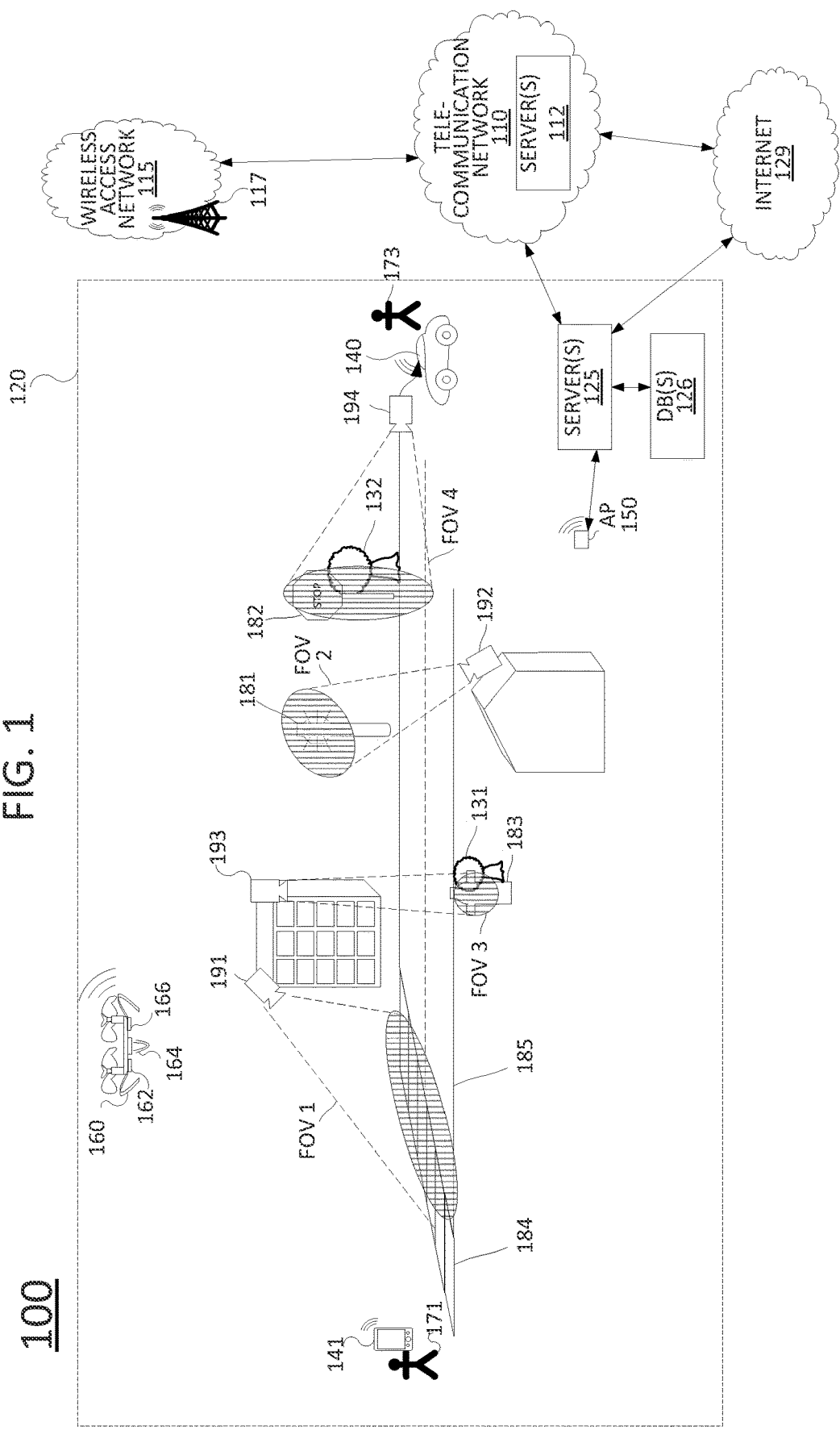
FIG. 1 illustrates an example system related to the present disclosure.

The present disclosure broadly discloses methods, non-transitory (i.e., tangible or physical) computer-readable media, and apparatuses for determining a potentially unsafe condition of an infrastructure item in accordance with imaging data obtained from imaging devices, where at least one imaging device is deployed in a vehicle and where the infrastructure item is visible from a road on which the vehicle operates. In particular, examples of the present disclosure feature a plurality of pervasive sensors working collaboratively to produce updates to the statuses of infrastructure items in a managed area, such as a city, a neighborhood, an intersection, a highway, a bridge, a tunnel, an overpass on a roadway, a rural environment, or the like. The sensors may be of differing types and the updates may result in record or database updates related to fixed or temporary elements detected by the sensors. An infrastructure database may include records indicating the locations of fixed infrastructure elements such as light posts, traffic lights, street markings, directional signs, fire hydrants/fire plugs, or similar safety infrastructures.

A geographic area, e.g., a managed area, may be defined to contain a contiguous or non-contiguous range of location coordinates. In one example, the geographic area may be comprised of coordinates in two or three dimensions that make up the space at and proximate to a city intersection. In another example, the geographic area may be defined by the location coordinates of all the parks with a city, one or more residential neighborhoods, all of the city itself, or any other definable spaces. In one example, the coordinates may be stored in an infrastructure database. The infrastructure database may also contain infrastructure records for various infrastructure elements that exist within the managed area. Each record may store data about an infrastructure item, or infrastructure element, such as a location of the infrastructure item, a type of infrastructure item, an installation date of the infrastructure item, a last checked date of the infrastructure item, a last serviced date of the infrastructure item, a manufacturer identity, a supplier identity, parts information, links to service manuals, and so forth.

The managed area may be equipped with a number of fixed sensors such as still or video cameras, infrared cameras, light detection and ranging (LiDAR) sensors, and so forth. There may also exist a number of transient sensors, such as cameras that are temporarily located within the managed area for a limited period of time. These may include dashboard cameras or other vehicle-mounted cameras, LiDAR sensors, smartphone cameras or LiDAR units, cameras of augmented reality (AR) headsets, and so forth. The sensors may also include other types of sensors, such as microphones, heat sensors, air quality sensors, motion sensors, vibration sensors, and others.

In one example, the sensors may be used to detect changes to infrastructure items that occur over time within the managed area (e.g., changes that affect the safety status of such infrastructure items). In one example, changes may be detected by a server that receives captured sensor data and identifies differences in the sensor data over time. For example, a camera may have a fixed location but may have an adjustable field of view in azimuth, elevation, or both, such that the first camera may be directed to capture images or videos of different views from the fixed location. The images or videos may be captured and stored in a study database (e.g., an infrastructure status database) and may be analyzed by the server over time. For instance, the server may use image analysis techniques to detect one or more changes in the images or video(s) that persist and develop over time, and more specifically that are associated with a change in a safety status of an infrastructure item. A threshold may be defined to indicate a period of time for which the detected change must exist for it to be deemed to be persistent. In one example, records/entries for the infrastructure items in the study database (e.g., sensor data collected and stored over time for comparison) may be linked to corresponding records/entries for the infrastructure items in the infrastructure database.

To illustrate, in one example, one or more cameras may capture images or video(s) which relate to a managed area that contains a painted crosswalk. Over time, the images or video(s) may be stored and compared by the server for the purpose of detecting wear, degradation, and/or obstruction (such as by dirt, gravel, etc.) of the painted crosswalk. In one example, an amount of wear or obstruction may be estimated, for example, by analyzing the differences in images to detect the change in the amount of paint that is visible, the reflectivity of the paint, etc. In this case, the server may respond to the detected change by generating a report/alert, automatically initiating additional sensor data collection to confirm the amount of wear (such as directing additional mobile cameras to the location of the crosswalk), and so forth.

In another example, one or more cameras may capture images or video(s) of a portion of a managed area that contains a traffic sign. Over time, the images captured may be compared by the server for the purpose of detecting an obstructed view, e.g., new growth of vegetation obstructing a "STOP" sign on a roadway. An amount of obstruction, if any, may be estimated by analyzing the differences in the images, e.g., still images or video frames to detect a change in the amount of the viewable portion of the sign. In the same manner, damage or the amount of wear due to weather or other factors may be detected, e.g., including loss of reflectivity of retroreflective paint, fading, etc. In response to the detection of obstruction or wear, the server may generate a report/alert, automatically initiate additional sensor data collection to confirm the amount of obstruction or wear, and so forth.

As noted above, mobile or transient sensors may be used to detect obstruction, wear, or other changes of infrastructure items in the managed area. For instance, there may be no fixed sensors that are available for use in all or a portion of the managed area. Thus, mobile/transient sensors that may be within the managed area may be used to supplement fixed sensors or the lack of such fixed sensors. For example, mobile cameras may be registered to opt-in to participate in providing image or video that can be used to detect changes in infrastructure items over time. For instance, participating mobile cameras may be associated with vehicles traveling in the managed area, and may capture and provide images or video that also contains metadata indicating the location, time, and orientation of the capture images. Similarly, cameras of users' mobile computing devices, such as smartphones, smart glasses, tablet computing devices, augmented reality (AR) headsets, and so forth may also capture and provide images or video when present in the managed area. In other words, the server may crowd-source images or other sensor data to monitor the conditions of infrastructure items in a managed area.

It should be noted that the mobile sensors may collect images, videos, and/or other sensor data relating to infrastructure items as the mobile sensors move through or within the managed area (e.g., according to their own routes that are not instructed or requested by the server). However, as an alternatively, or in addition, the server may request or instruct mobile sensor devices to proceed to locations of specific infrastructure items or to navigate particular routes in order to gather images, video, and/or other sensor data relating to one or more specific infrastructure items. For instance, infrastructure items that are already identified as having changes detected may then be marked for follow up and further investigation, which may be prioritized by directing mobile sensors to the infrastructure item(s) rather than waiting for a sufficient number of mobile sensor devices to transit past the location(s) of the infrastructure item(s) on their own accounts.

To illustrate, upon the detection of a change in an infrastructure item based on the analysis and detection of a potentially unsafe condition, the server may automatically generate an investigation to confirm or gather additional data related to the detected change. In one example, additional sensor devices may be directed at or to the location of the infrastructure item. For example, the server may transmit an instruction or request to mobile sensor devices, which may include the location to be studied and the type of sensor data to be collected at that location. Also included may be a duration for the investigation. The server may identify any fixed and/or mobile sensors that are proximate to the location of the infrastructure and instruct and/or request one or more of these sensors to collect the specified data. For example, additional fixed-location cameras may be instructed to reorient to direct fields of view toward the infrastructure item for which the change is to be confirmed. Similarly, the server may transmit requests to one or more mobile sensors that are not currently in the vicinity of the location, but which may be able to move to the location, or which may have planned route(s) that will pass the location of the infrastructure time. For instance, a request may be sent to an autonomous vehicle (AV), such as an autonomous aerial vehicle (AAV), which may decide to fulfill the request to proceed to the location, and to capture and transmit images or videos of the infrastructure item. Alternatively, or in addition, an open investigation may be stored by the server, e.g., in the study database, which may be retrieved by mobile sensors that opt-in to participate. For instance, a participating AV may contact the server and obtain open investigation items from the study database, and may then collect images and/or videos regarding one or more infrastructure items that are along a planned route through the managed area (or for which the AV may determine that it can alter a planned route in order to participate in capturing images, videos, LiDAR data, etc.).

In one example, other types of sensors besides cameras or LiDAR sensors may be used to detect changes in infrastructure items in the area. As one example, fixed or mobile microphones may capture sound samples over time and detect anomalies that may indicate a change in the managed area related to the infrastructure. For example, sound samples over time may be analyzed to identify suspected potholes or structural weakness in a traffic bridge. Similarly, microphones may detect the sound of a gas leak, breakage of glass or other materials, and so forth. In one example, mobile microphones may be registered and opted-in to participate, and may time and location-stamp audio samples before transmission to the server for analysis. Additional sensors may include high-precision radar sensors (e.g., capable of generating centimeter or millimeter-accurate point clouds), and so forth.

Thus, the server may maintain a study of an infrastructure item over a period of time. For instance, each sensor that captures sensor data (e.g., images and/or videos) may record a location, a time, and the type of sensor content data (e.g., images, videos, sound, and/or other measurements). The sensor data may be complied and cross-referenced in time to be used to update the infrastructure database record for the infrastructure items to be analyzed. The sensor data may also be used to initiate an investigation associated with the infrastructure item, to supplement an investigation associated with the infrastructure item, for instance to perform maintenance, to audit or update the infrastructure database, and so forth. For example, if an infrastructure element is detected to exist at a location in accordance with the collected sensor data, its existence and location may be compared with the inventory of infrastructure elements in the infrastructure database. If the infrastructure database record is in error, then it may be corrected. Likewise, if the server detects the absence of an infrastructure item (such as a traffic sign having been stolen or fallen off, based on the sensor data) and the infrastructure database shows that the infrastructure item should exist, either a database correction is made or a work order for repair or replacement may be issued by the server. In still another example, the server, may detect a potentially unsafe condition, or a change in condition to an unsafe condition, based on a single immediate event, rather than by an analysis of changes in sensor readings over a more extended period of time. For instance, the server may detect an open fire hydrant from one or more recently captured images from one or more fixed-location or mobile cameras (e.g., via a detection model, such as a trained machine learning model (MLM)). In such case, the server may generate an alert or automatic instruction to dispatch personnel to the location in order to confirm the status of the fire hydrant, and to close the fire hydrant (e.g., if opened without authorization during a heat wave), and so forth. These and other aspects of the present disclosure are discussed in greater detail below in connection with the examples of FIGS. 1-4.

To aid in understanding the present disclosure, FIG. 1 illustrates an example system 100, related to the present disclosure. As shown in FIG. 1, the system 100 connects a mobile device 141, vehicle 140 (including camera 194, e.g., a dashcam), autonomous aerial vehicle (AAV) 160 (including a camera 162), server(s) 112, server(s) 125, DB(s) 126, access point 150, and cameras 191-193, with one another and with various other devices via a core network, e.g., a telecommunication network 110, a wireless access network 115 (e.g., a cellular network), and Internet 129. In the example of FIG. 1, cameras 191-193, vehicle 140 and/or camera 194, mobile device 141 (e.g., also including a camera) and other sensor devices may be registered to participate in an infrastructure monitoring service (e.g., the owners of these devices providing explicit authorization for such participation) in an area 120, e.g., managed and/or provided by server(s) 125. In one example, access point (AP) 150 associated with server(s) 125 may establish a wireless local area network (WLAN), e.g., an Institute for Electrical and Electronics Engineers (IEEE) 802.11 network (e.g., a Wi-Fi network), an IEEE 802.15, e.g., a Bluetooth network, a ZigBee network, and so forth, a mesh network comprising a combination of interconnected devices using a plurality of such communication modalities and protocols, or the like. Accordingly, in one example, the cameras 191-193, mobile device 141, vehicle 140 and/or camera 194, AAV 160, and so forth may communicate with server(s) 125 via AP 150.

The access point 150 may comprise an IEEE 802.11 (Wi-Fi) router, an IEEE 802.15 access point (e.g., a "Bluetooth" access point, a "ZigBee" access point, etc.), and so forth. In one example, AP 150 may provide a dedicated short range communication (DSRC) network. For example, a DSRC network may be operated by a governmental entity or a private entity managing area 120. In general, DSRC networks enable wireless vehicle-to-vehicle (V2V) communications and vehicle-to-infrastructure (V2I) communications. It should also be noted that although only one access point 150 is illustrated in FIG. 1, in other, further, and different examples, additional access points may be deployed within the area 120 to provide additional WLAN, Wi-Fi, or other wireless network coverages to the various participating devices (e.g., the cameras 191-193, mobile device 141, vehicle 140 and/or camera 194, AAV 160, etc.). In accordance with the present disclosure, AAV 160 may include a camera 162 and one or more radio frequency (RF) transceivers 166 for cellular communications and/or for non-cellular wireless communications. In one example, AAV 160 may also include one or more module(s) 164 with one or more additional controllable components, such as one or more infrared, ultraviolet, and/or visible spectrum light sources, a light detection and ranging (LiDAR) unit, a radar unit, a microphone, a speaker, and so forth.

In one example, at least some of the cameras 191-193 may be in communication with or otherwise accessible to server (s) 125 via one or more wired networks, e.g., via respective home or business network connections via one or more Internet service provider (ISP) networks. Similarly, in one example, the area 120 may further include a Local Area Network (LAN), e.g., an Ethernet network. For instance, the area 120 may include a university campus, a corporate campus, a planned community, etc., which may have a wired LAN to which at least some participating devices may be connected (e.g., cameras 191-193). It should be noted, however, that these participating devices may still be deployed and owned by respective property owners, tenants, managers, etc. and voluntarily registered to participate in an infrastructure monitoring service provided via server(s) 125. For ease of illustration, not all of the possible wired connections are shown in FIG. 1.

In one example, the server(s) 125 may comprise a computing system, or systems, such as one or more instances of computing system 400 depicted in FIG. 4, and may be configured to provide one or more functions for determining a potentially unsafe condition of an infrastructure item in accordance with imaging data obtained from imaging devices, where at least one imaging device is deployed in a vehicle and where the infrastructure item is visible from a road on which the vehicle operates, in accordance with the present disclosure. For example, server(s) 125 may be configured to perform one or more steps, functions, or operations in connection with the example method 300 described below. In addition, it should be noted that as used herein, the terms "configure," and "reconfigure" may refer to programming or loading a processing system with computer-readable/computer-executable instructions, code, and/ or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 4 and discussed below) or multiple computing devices collectively configured to perform various steps, functions, and/or operations in accordance with the present disclosure.

In one example, DB(s) 126 may comprise one or more physical storage devices integrated with server(s) 125 (e.g., database servers), attached or coupled to the server(s) 125, or otherwise accessible to the server(s) 125 to store various types of information in support of an infrastructure monitoring service, in accordance with the present disclosure. For example, DB(s) 126 may include an infrastructure database to store records/profiles of infrastructure items such as street light 181, STOP sign 182, fire hydrant 183, crosswalk 184, and other infrastructure items. For instance, for each of these infrastructure items, the infrastructure database may include an record storing: a location of the infrastructure item, a type of the infrastructure item, a manufacturer, a model number, and/or a serial number of the infrastructure item, or the like (if applicable), a deployment date of the infrastructure item, a last serviced/maintained date and/or a service history comprising a list of service dates, the service(s) performed, etc., a last inspected date and/or inspection history, an "official image," e.g., entered into the database by authorized personnel of the infrastructure monitoring service (e.g., a city public works department or the like), a 2D or 3D model of the infrastructure item, one or more sample images of the infrastructure item, and so forth.

DB(s) 126 may also include a camera/sensor database with a camera/sensor profile for each camera or other sensors, such as cameras 191-194, and camera 162 of AAV 160. For instance, a camera profile may include a camera location, orientation, field-of-view (e.g., viewport size), resolution, range, etc., as well as the maximum ranges/values for any or all of such features which may be adjustable/configurable for a particular camera. It should be noted that cameras 194 and 162 may be registered as transient cameras, and that the profiles for these cameras may include additional information, such as the speed and direction of movement, a current location, the type of vehicle 140 in which camera 194 is deployed (e.g., a surface-operating autonomous or non-autonomous vehicle), and similarly for camera 162 and AAV 160, a duration of time for which the respective camera is anticipated to be available to server(s) 125 while within area 120, and so forth. In addition, a record for each camera or other sensors in the camera/sensor database may include an identifier, such as an Internet Protocol (IP) address or the like, via which the camera or other sensors may be communicated with by the server(s) 125 over one or more networks.

In addition, DB(s) 126 may include a study database (e.g., an infrastructure status database) to store images, videos, LiDAR sensor data, and so forth, which may be captured via cameras 191-194, camera 162, and so forth. Notably, the server(s) 125 may use image analysis techniques to detect one or more changes in the images, video(s), LiDAR, and/or other sensor data that persist over time, and more specifically that are associated with a change in a safety status of an infrastructure item. In one example, records/entries for the infrastructure items in the study database (e.g., sensor data collected and stored over time for comparison) may be linked to corresponding records/entries for the infrastructure items in the infrastructure database. In one example, the study database may also include records of open investigations, e.g., investigations to collect additional sensor data relating to infrastructure items that are detected to have changes potentially affecting safety statuses (broadly potentially unsafe conditions).

In one example, the system 100 includes a telecommunication network 110. In one example, telecommunication network 110 may comprise a core network, a backbone network or transport network, such as an Internet Protocol (IP)/multi-protocol label switching (MPLS) network, where label switched routes (LSRs) can be assigned for routing Transmission Control Protocol (TCP)/IP packets, User Datagram Protocol (UDP)/IP packets, and other types of protocol data units (PDUs), and so forth. It should be noted that an IP network is broadly defined as a network that uses Internet Protocol to exchange data packets. However, it will be appreciated that the present disclosure is equally applicable to other types of data units and transport protocols, such as Frame Relay, and Asynchronous Transfer Mode (ATM). In one example, the telecommunication network 110 uses a network function virtualization infrastructure (NFVI), e.g., host devices or servers that are available as host devices to host virtual machines comprising virtual network functions (VNFs). In other words, at least a portion of the telecommunication network 110 may incorporate software-defined network (SDN) components.

As shown in FIG. 1, telecommunication network 110 may also include a one or more servers 112. In one example, the server(s) 112 may each comprise a computing system, such as computing system 400 depicted in FIG. 4, and may be individually or collectively configured to provide one or more functions for determining an unsafe condition of an infrastructure item in accordance with imaging data obtained from imaging devices, where at least one imaging device is deployed in a vehicle and where the infrastructure item is visible from a road on which the vehicle operates, such as described in connection with the example method 300 below. For instance, server(s) 112 may provide the same or similar functions as describe in connection with server(s) 125. For instance, telecommunication network 110 may provide an infrastructure monitoring service as described herein, e.g., in addition to voice, data, television and other telecommunication services. For ease of illustration, various additional elements of telecommunication network 110 are omitted from FIG. 1.

In one example, wireless access network 115 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 115 may comprise an access network in accordance with any "second generation" (2G), "third generation" (3G), "fourth generation" (4G), Long Term Evolution (LTE), "fifth generation" (5G), or any other existing or yet to be developed future wireless/cellular network technologies. While the present disclosure is not limited to any particular type of wireless access network, in the illustrative example, wireless access network 115 is shown as a UMTS terrestrial radio access network (UTRAN) subsystem. Thus, base station 117 may comprise a Node B, an evolved Node B (eNodeB), a gNodeB (or gNB), etc. As illustrated in FIG. 1, mobile device 141 may be in communication with base station 117, which provides connectivity between mobile device 141 and other endpoint devices within the system 100, various network-based devices, such as server 112, and so forth. In addition, in one example, vehicle 140, AAV 160, cameras 191-193, and other devices may also be in communication with base station 117, e.g., where these components may also be equipped for cellular communication. In one example, wireless access network 115 may be operated by the same or a different service provider that is operating telecommunication network 110.

In one example, vehicle 140 may be equipped with an associated on-board unit (OBU) (e.g., a computing device and/or processing system) for communicating with server(s) 125, either via the wireless access network 115 (e.g., via base station 117), via wireless access point 150), or both. For example, the OBU may include a global positioning system (GPS) navigation unit that enables the driver to input a destination, and which determines the current location, calculates one or more routes to the destination, and assists the driver in navigating a selected route. In one example, vehicle 140 may comprise an autonomous or semi-autonomous vehicle that may handle various vehicular operations, such as braking, accelerating, slowing for traffic lights, changing lanes, etc. For instance, vehicle 140 may include a LiDAR system (which may be part of the camera 194 or a separate unit), a GPS unit, a radar unit, and so forth which may be configured to enable vehicle 140 to travel to a destination with little to no human control. However, in one example, vehicle 140 may have a human operator, e.g., user 173, wherein the OBU may provide various driver assistance services, such as lane departure warnings, blind-spot detection and warnings, lane keep assistance (LKAS), cruise control, navigation directions, traffic information, speed limit notifications, etc.

In one example, mobile device 141 may comprise any subscriber/customer endpoint device configured for wireless communication such as a laptop computer, a Wi-Fi device, a Personal Digital Assistant (PDA), a mobile phone, a smartphone, an email device, a computing tablet, a messaging device, and the like. In one example, mobile device 141 may have both cellular and non-cellular access capabilities. Thus, mobile device 141 may be in communication with server(s) 125 via a wireless connection to base station 117 and/or to access point 150. For instance, mobile device 141 may include one or more transceivers for cellular based communications, IEEE 802.11 based communications, IEEE 802.15 based communications, and so forth. In one example, mobile device 141 may be associated with user 171.

In a first illustrative example, server(s) 125 may gather and store images, video, LiDAR sensor data, or other sensor data, e.g., in a study database of DB(s) 126 in order to detect unsafe conditions, or changes to infrastructure items indicative of potentially unsafe conditions/changes in safety statuses. For instance, server(s) 125 may obtain images, videos, etc. from cameras 191-194, camera 162, and/or other sensors, which may be registered and opted-in to transmit such data to server(s) 125. Cameras 191-193 may have fields of view (FOVs) 1-3, as illustrated in FIG. 1. For example, these may be fixed FOVs or may represent current FOVs at one instance in time, where the FOVs may be adjustable in azimuth, elevation, width, height, focal distance, etc. In the illustration of FIG. 1, camera 191 may have a FOV 1 directed at a crosswalk 184 (e.g., an infrastructure item), camera 192 may have a FOV 2 directed at a street light 181, and camera 193 may have a FOV 3 directed at a fire hydrant 183.

In one example, server(s) 125 may generate (e.g., train) and store one or more detection models that may be used by server(s) 125, cameras 191-194, and/or camera 162 (or an on-board processing system of AAV 160) in order to detect changes to infrastructure items, or conditions of infrastructure items indicative of unsafe statuses (e.g., changes from safe to unsafe statuses). For example, a machine learning model (MLM) may be trained to detect and distinguish between acceptable (or better) and poor condition crosswalks, between crosswalks that are clear and crosswalks covered by puddles, dirt or other debris, etc., between STOP signs in good condition and STOP signs that are worn or weathered, between STOP signs that are clearly visible and STOP signs that have been visually obstructed by overgrown vegetation, between street lights that are on and street lights that are off or have lights out, between fire hydrants that are closed and fire hydrants that are open (e.g., expelling water), between fire hydrants that are clear and fire hydrants that are blocked by overgrown vegetation, or other objects (e.g., parked cars in the street obstructing access to the fire hydrant, bicycles, cardboard or scrap metal recycling leaning against the fire hydrant, etc.), and so forth.

The MLM(s), or signature(s), may be specific to a particular type, or types of imaging and/or spatial sensor data, or may take multiple types of sensor data as inputs. For instance, with respect to images or videos, the input sensor data may include low-level invariant image data, such as colors (e.g., RGB (red-green-blue) or CYM (cyan-yellow-magenta) raw data (luminance values) from a CCD/photosensor array), shapes, color moments, color histograms, edge distribution histograms, etc. Visual features may also relate to movement in a video and may include changes within images and between images in a sequence (e.g., video frames or a sequence of still image shots), such as color histogram differences or a change in color distribution, edge change ratios, standard deviation of pixel intensities, contrast, average brightness, and the like. For instance, these features could be used to help quantify and distinguish a surface covered by water from that of a dry surface (e.g., a wet road surface may appear to be more reflective when a car headlight temporarily illuminates the area, particularly at night).

In one example, MLM(s), or signature(s), may take multiple types of sensor data as inputs. For instance, MLM(s) or signature(s) may also be provided for detecting particular items based upon LiDAR input data, infrared camera input data, radar data, and so on. In accordance with the present disclosure, a detection model may comprise a machine learning model (MLM) that is trained based upon the plurality of features available to the system (e.g., a "feature space"). For instance, one or more positive examples for a feature may be applied to a machine learning algorithm (MLA) to generate the signature (e.g., a MLM). In one example, the MLM may comprise the average features representing the positive examples for an item in a feature space. Alternatively, or in addition, one or more negative examples may also be applied to the MLA to train the MLM (where "positive" and "negative" do not necessarily relate to whether the features are indicative of a safe or unsafe condition of an infrastructure item, but rather are indicative of whether a set of features is or is not indicative of being a member of a group for which the detection model is for detecting, e.g., a "positive" example of an unsafe crosswalk may include visual data comprising an image of a wet crosswalk, and a "negative" example may comprise an image of dry and freshly painted crosswalk).

The machine learning algorithm (MLA) or the machine learning model (MLM) trained via the MLA may comprise, for example, a deep learning neural network, or deep neural network (DNN), a generative adversarial network (GAN), a support vector machine (SVM), e.g., a binary, non-binary, or multi-class classifier, a linear or non-linear classifier, and so forth. In one example, the MLA may incorporate an exponential smoothing algorithm (such as double exponential smoothing, triple exponential smoothing, e.g., Holt-Winters smoothing, and so forth), reinforcement learning (e.g., using positive and negative examples after deployment as a MLM), and so forth. It should be noted that various other types of MLAs and/or MLMs may be implemented in examples of the present disclosure, such as k-means clustering and/or k-nearest neighbor (KNN) predictive models, support vector machine (SVM)-based classifiers, e.g., a binary classifier and/or a linear binary classifier, a multi-class classifier, a kernel-based SVM, etc., a distance-based classifier, e.g., a Euclidean distance-based classifier, or the like, and so on. In one example, a trained detection model may be configured to process those features which are determined to be the most distinguishing features of the associated item/object or concept, e.g., those features which are quantitatively the most different from what is considered statistically normal or average from other items/objects or concepts that may be detected via a same system, e.g., the top 20 features, the top 50 features, etc.

In one example, one or more detection models may be trained and/or deployed by server(s) 125 to process images, videos, LiDAR data, radar data, or the like to identify patterns in the features of the sensor data that match the detection model(s), e.g., for an overgrown STOP sign, an open fire hydrant, a weathered crosswalk, etc. In one example, a match may be determined using any of the visual features mentioned above, e.g., and further depending upon the weights, coefficients, etc. of the particular type of MLM. For instance, a match may be determined when there is a threshold measure of similarity among the features of the video or other data streams(s) and a signature for an overgrown STOP sign, an open fire hydrant, a weathered crosswalk, etc. In one example, one or more detection models may also be loaded to one or more of the cameras 191-194, camera 162 and/or AAV 160, which may independently identify potentially unsafe conditions (and/or changes from safe to unsafe conditions), and which may notify server(s) 125 of any infrastructure items for which such change(s) are detected.

In one example, detection models (e.g., MLMs) for detecting various conditions of infrastructure items may be trained using previously gathered images, videos, LiDAR, and/or other sensor data. For instance, server(s) 125 may gather and store in DB(s) 126 images, video, LiDAR, radar, and/or other sensor data relating to street light 181, STOP sign 182, fire hydrant 183, crosswalk 184, etc., wherein respective detection models may be trained with such sensor data for each respective infrastructure item as positive training examples. Thereafter, additional sensor data relating to such infrastructure items may be gathered and applied to the detection model(s). The output of the detection model may be indicative of whether the new sensor data is or is not indicative of the class defined by the detection model. In addition, a confidence factor may be quantified by the output. For example, for a binary classifier, a confidence score may be indicated by a distance from a point represented by the set of features in a hyper-dimensional space from a separation hyperplane. In one example, when a confidence score is below a threshold, the server(s) 125 may determine that the more recent sensor data is indicative of a potentially unsafe condition.

Alternatively, or in addition, an unsafe condition and/or a change in a condition of an infrastructure item may be determined by detecting changes between images over time, quantifying the magnitude of the differences, and averaging over multiple comparisons, e.g., using a structural similarity index (SSIM), peak signal to noise ratio (PSNR) metric, mutual information, or the like based upon various features of the images or videos (such as RGB values, luminance values, gradients (e.g., changes of such values between pixels), etc. for individual pixels, blocks of pixels, and so forth).

In one example, server(s) 125 may generate a 2D or 3D object model of an infrastructure item, and may then calculate a SSIM, PSNR, mutual information, or other measures of the differences between the new image(s) and the object model, a 2D projection of a 3D object model, etc. Alternatively, or in addition, server(s) 125 may use one or more representative images of an infrastructure item and calculate one or more measures of the differences between the new image(s) and the one or more representative images, and then take the average, a sum/aggregate, or the like as a matching score. In one example, the score may be compared to a static threshold (e.g., a predefined fixed threshold for the score value) or a dynamic threshold (e.g., based upon percentiles of score values, or the like) to determine the first condition or the second condition. For instance, if above the threshold, the first condition may be determined, and if below the threshold, the second condition may be determined (or vice versa). In one example, a matching score may be an aggregate score of one or more of a PSNR, SSIM, mutual information, etc. with regard to one or more representative images. For instance, instead of solely relying upon a mutual information metric, the present disclosure may use multiple metrics in the average or aggregate.

In the example, of FIG. 1, camera 191 may be directed at crosswalk 184 and may provide images and/or videos to server(s) 125 to be stored in a study database of DB(s) 126. In one example, server(s) 125 may retrieve the collected data to determine over time that the condition of crosswalk 184 has changed (e.g., to a potentially unsafe condition). In one example, not all of the collected images or videos may be retained over a period of time. For instance, server(s) 125 may sample the images or videos and retain a portion of the available data. Alternatively, or in addition, camera 191 may send sampled images or videos to server(s) 125. As noted above, server(s) 125 may determine the condition of the crosswalk 184 (or changes thereto, such as change from a safe to an unsafe condition) via one or more detection models (e.g., machine learning-based detection models for a "good condition crosswalk" and/or a detection model for "poor condition crosswalk," a "debris-covered crosswalk," a "water-covered crosswalk," etc.). Alternatively, or in addition, server(s) 125 may use a 2D object model, and/or a 3D object model of the crosswalk 184, one or more representative images of the crosswalk 184, and so forth, for comparison with newly captured image(s) from camera 191. It should be noted that the representative images or videos may also be captured via the camera 191 (e.g., at an earlier time), and that such images or videos may also be used to generate one or more object models for the crosswalk 184.

In one example, when the server(s) 125 is less confidently determined that the sensor data gathered with regard to crosswalk 184 belongs to the class of crosswalk (e.g., that crosswalk 184 is in fact a crosswalk), this may be indicative of a change in the conditions such that the crosswalk is not clearly defined (e.g., the crosswalk is weathered or worn, is covered by a large amount of dirt or other debris, or the like). In other words, when the image(s) from camera 191 are classified as being a "crosswalk" with only a 60 percent confidence level, a 65 percent confidence level, etc. this may be considered to be indicative of a poor condition of the crosswalk 184. Similarly, a poor condition of the crosswalk 184 may be determined when the SSIM, PSNR, mutual information, or other difference measures between current image(s) from camera 191 and one or more representative images, one or more object models, an average or aggregate thereof, etc. exceeds or falls below a threshold, for instance.

In the present example, the crosswalk 184 may be identified from images of camera 191 as a "crosswalk" with a 60 percent confidence, which may be below a threshold that is indicative of a poor condition (e.g., potentially unsafe) crosswalk. In one example, an alert may be automatically generated and provided to personnel responsible for managing infrastructure items in the area 120, such as a public works department, a department of public safety, etc. Alternatively, or in addition, server(s) 125 may initiate a further investigation of the condition of crosswalk 184. For instance, server(s) 125 may direct additional sensor devices to the location of crosswalk 184. As just one example, server(s) 125 may request mobile sensor devices to capture and provided to server(s) 125 additional images of crosswalk 184. In this case, vehicle 140 may be navigating a planned route that will pass crosswalk 184. As such, vehicle 140 may respond to server(s) 125 that vehicle 140 will provide one or more of such images. In one example, other vehicles or other mobile sensor devices may similarly respond. In this case, vehicle 140 may capture one or more images of the crosswalk 184 via camera 194, and may provide these images to server(s) 125. Server(s) 125 may similarly analyze these one or more images (e.g., calculating a difference metric, applying one or more machine learning models and obtaining an output and score/confidence value, etc.), to confirm the condition of the crosswalk 184. In one example, user 171 with mobile device 141 may be walking past the crosswalk 184, may receive a request from server(s) 125, and may indicate to server(s) 125 that the user 171 is able to provide one or more images of the crosswalk 184 responsive to the request. As such mobile device 141 may be caused to record and provide to server(s) 125 one or more images and/or videos of the crosswalk 184. In one example, when the condition of the crosswalk 184 is confirmed via one or more additional mobile sensor devices, the server(s) 125 may generate an alert, generate an automated work order to repair or clean the crosswalk, and so on.

In one example, conditions of crosswalk 184 may be correlated to weather conditions in the area 120 at particular times for which the conditions are determined. For instance, server(s) 125 may determine from images, LiDAR, radar, or other sensor data related to crosswalk 184 stored in DB(s) 126 that crosswalk 184 is determined to be in an unsafe condition most times that the weather of area 120 is determined to be "raining" and in a safe condition at all other times, or in an unsafe condition when the weather is "raining" and the time is after dark, and in a safe condition when the weather is other than "raining." Accordingly, in such an example, server(s) 125 may include such weather correlations in the alert. For instance, if the crosswalk 184 is generally in a safe condition except for when the weather is "raining," it may be that there is a drainage problem, or a surface reflectivity problem, rather than the crosswalk 184 being in a deteriorated condition. In other words, the crosswalk 184 may be more easily identified as not being in need of repainting, but may need another remedy, e.g., increasing water flow away from the crosswalk during rainy conditions.

In a next example, camera 192 may be directed at street light 181 and may provide images and/or video to server(s) 125 to be stored in a study database of DB(s) 126. In one example, server(s) 125 may retrieve the collected data to determine over time that the condition of street light 181 is potentially unsafe (e.g., is changed from a safe to an unsafe condition). As in the previous example, server(s) 125 may determine the condition of street light 181 via one or more detection models (e.g., machine learning-based detection models for "illuminated" and/or for "non-illuminated"). Alternatively, or in addition, server(s) 125 may use a 2D object model, and/or a 3D object model of the street light 181, one or more representative images of the street light 181 (e.g., in the illuminated or non-illuminated condition, or both), and so forth, for comparison with newly captured image(s) from camera 192.

In this case, it may be determined that the street light 181 is in a "non-illuminated" condition or even "reduced illuminated state" (e.g., an unsafe condition). For instance, server(s) 125 may compare multiple images from camera 192 to one or more representative images of the street light 181 in the "illuminated" condition, and may determine that a difference measure (e.g., SSIM, PSNR, mutual information, or the like, or an aggregate/combination of such measures) exceeds a threshold. Alternatively, or in addition, server(s) 125 may compare multiple images from camera 192 to one or more representative images of the street light 181 in the "non-illuminated" condition, and may determine that a difference measure (e.g., SSIM, PSNR, mutual information, or the like, or an aggregate/combination of such measures) is below a threshold. In either case, in an illustrative example, server(s) 125 may conclude that the street light 181 is non-illuminated, and hence either out or off. In addition, server(s) 125 may generate an alert of the finding of the street light 181 in an unsafe condition. It should be noted that with respect to street light 181, the relevant sensor data (e.g., images from camera 192) may be gathered and used for comparison only with respect to non-daylight times, e.g., after sunset and before sunrise, after twilight and before dawn, etc.

In another example illustrated in FIG. 1, camera 193 may be directed at fire hydrant 183 and may provide images and/or videos to server(s) 125 to be stored in a study database of DB(s) 126. In one example, server(s) 125 may retrieve the collected data to determine over time that the condition of fire hydrant 183 is potentially unsafe (e.g., is changed from a safe to an unsafe condition). As in the previous examples, server(s) 125 may determine the condition of fire hydrant 183 via one or more detection models (e.g., machine learning-based detection models for "open" and/or for "closed/normal," for "overgrown with vegetation," for "leaking," etc.). Alternatively, or in addition, server(s) 125 may use a 2D object model, and/or a 3D object model of the fire hydrant 183, one or more representative images of the fire hydrant 183 (e.g., in the open condition, the closed/normal condition, an overgrown condition, the leaking condition, etc.), for comparison with newly captured image(s) from camera 193. In an illustrative example, server(s) 125 may determine that fire hydrant 183 is in an "overgrown condition" (e.g., an unsafe condition) via analysis of the captured images from camera 193 with respect to one or more detection models, object models, and/or representative images. For instance, as illustrated in FIG. 1 a bush 131 may be growing so as to encroach upon the fire hydrant 183. In addition, the bush 131 may fully or partially hide the fire hydrant 183 from view from one or more directions, thereby potentially inhibiting its detection by a fire fighting crew during an emergency.

Accordingly, server(s) 125 may generate an alert of the finding of the fire hydrant 183 in an unsafe condition. Alternatively, server(s) 125 may direct one or more mobile sensor devices to the location of the fire hydrant 183, or to reorient toward a direction of the fire hydrant 183 for further investigation (e.g., to gather additional images, LiDAR data, or other sensor data). For instance, server(s) 125 may request or instruct camera 191 to reorient FOV 1 toward fire hydrant 183 to capture and provide to server(s) 125 additional images of fire hydrant 183 from a different perspective from that of camera 193. Similarly, server(s) 125 may request or instruct AAV 160 to deploy to the location of the fire hydrant 183 to capture and provide to server(s) 125 additional images of fire hydrant 183. Server(s) 125 may then confirm the unsafe condition of fire hydrant 183 based upon the additional sensor data (e.g., images) that are collected from camera 191 and/or camera 162 of AAV 160. Upon such confirmation, server(s) 125 may then generate an alert of the finding of the fire hydrant 183 in an unsafe condition, generate an automated work order to perform landscape maintenance at and near the location of fire hydrant 183, and so forth.

In still another example, STOP sign 182 may be an additional infrastructure item in the managed area 120. For illustrative purposes, it may be assumed that there are no fixed cameras or other sensors having the STOP sign 182 within a field of view. However, server(s) 125 may monitor the condition of STOP sign 182 via mobile sensor devices, such as camera 194 of vehicle 140, and other mobile sensors. In particular, server(s) 125 may gather images and/or videos to be stored in a study database of DB(s) 126. In one example, server(s) 125 may retrieve the collected data to determine over time that the condition of STOP sign 182 is potentially unsafe (e.g., is changed from a safe to an unsafe condition). As in the previous examples, server(s) 125 may determine the condition of STOP sign 182 via one or more detection models (e.g., machine learning-based detection models for "normal/good condition," for "overgrown with vegetation," for "worn/weathered," etc.). Alternatively, or in addition, server(s) 125 may use a 2D object model, and/or a 3D object model of the STOP sign 182 (e.g., in a good and unobstructed condition), one or more representative images of the STOP sign 182 (e.g., in a good and unobstructed condition, in an overgrown condition, etc.), for comparison with newly captured image(s) from camera 194 and other sensors.

In an illustrative example, server(s) 125 may determine that STOP sign 182 is in an "overgrown condition" (e.g., an unsafe condition) via analysis of the captured images from camera 194 (and other sensors) with respect to one or more detection models, object models, and/or representative images. For instance, as illustrated in FIG. 1 a tree 132 may be growing so as to encroach upon the visibility of STOP sign 182. For example, the tree 132 may fully or partially hide the STOP sign from view from one or more directions.

Accordingly, server(s) 125 may generate an alert of the finding of the STOP sign 182 in an unsafe condition. Alternatively, server(s) 125 may direct one or more mobile sensor devices to the location of the STOP sign 182, or to reorient toward a direction of the STOP sign 182 for further investigation (e.g., to gather additional images, LiDAR data, or other sensor data). For instance, server(s) 125 may request or instruct AAV 160 to deploy to the location of STOP sign 182 to capture and provide to server(s) 125 with additional images of STOP sign 182. In one example, AAV 160 may be instructed to capture images of STOP sign 182 under a particular lighting condition or conditions, e.g., to illuminate and measure reflectivity, for instance. Server(s) 125 may then confirm the unsafe condition of STOP sign 182 based upon the additional sensor data (e.g., images) that are collected from camera 162 of AAV 160 (and/or one or more additional mobile sensor devices). Upon such confirmation, server(s) 125 may then generate an alert of the finding of the STOP sign 182 in an unsafe condition, generate an automated work order to perform landscape maintenance at and near the location of STOP sign 182, etc.

It should be noted that in regard to any of the preceding examples, sensor devices may alternatively or additionally be loaded with and configured to apply detection models or otherwise calculate difference measures via comparison to object models and/or representative images (e.g., as an alternative or in addition to server(s) 125 performing these steps). For instance, in one example, vehicle 140 may determine via images, light sensors on vehicle 140, and/or LiDAR sensor data of camera 194 that street light 181 appears to be out/off or significantly dimmed relative to other street lights in the area. Vehicle 140 may then report this finding to server(s) 125. In addition, server(s) 125 may then receive a number of similar reports from other mobile sensor devices (e.g., from other vehicles passing the street light 181). In one example, when a threshold number or percentage of mobile sensor devices are reporting the same condition for the street light 181, server(s) 125 may then generate an alert that the street light 181 is in an unsafe condition (e.g., appears to be out/off, or one or more light sources (e.g., bulbs or light emitting diodes) within the street light are not operating). In still another example, server(s) 125 may rely upon the artificial intelligence (AI)/ML capabilities of the sensor devices themselves reporting on whether a sign is or is not readable, whether a lane marking or crosswalk is or is not detected, etc. For instance, STOP sign 182 may be determined to be in a good/safe condition when more than 90 percent of vehicles can detect the STOP sign, more than 95 percent of vehicles can detect the STOP sign 182, more than 98 percent of vehicles can detect the STOP sign 182, etc. For example, many vehicles are now equipped with sensors that can detect and read STOP signs, "no turn on red" signs, speed limit signs (including the speed limits indicated thereby), and so forth, and which may present such information via a display for a driver of the vehicle (or which may be used by an autonomous vehicle to set its speed, determine which lane to be in, to determine whether to turn right on red, etc.). It should be noted that these thresholds may be different for areas where autonomous vehicles (AVs) are permitted to operate and areas where AVs are not permitted to operate. In the latter case, it may be deemed that the STOP sign is in good condition when 90 percent of vehicles can detect that the STOP sign 182 is in fact a STOP sign. The other 10 percent may account for faulty driving assistance systems, for delivery trucks blocking the STOP sign 182, etc. When detection of the STOP sign 182 is below the threshold, it may be considered as indicative that there is a more long term issue that is causing the STOP sign 182 to be less detectable (such as overgrowth, weathering/wear, etc.). In the case of an area where AV use is prevalent, a more rigorous threshold may be applied, for instance 98 percent, 99 percent, 99.5 percent, etc. In one example, with regard to a STOP sign or other traffic related signs, a safe condition may be associated with a first confidence of determination of alphanumeric information of the infrastructure item (e.g., "stop," "speed limit 25," "no turn on red," etc.), and an unsafe condition may be associated with a second confidence of determination of the alphanumeric information of the infrastructure item, e.g., where confidence levels may be self-reported by vehicles or other mobile sensors.

Figure 2:
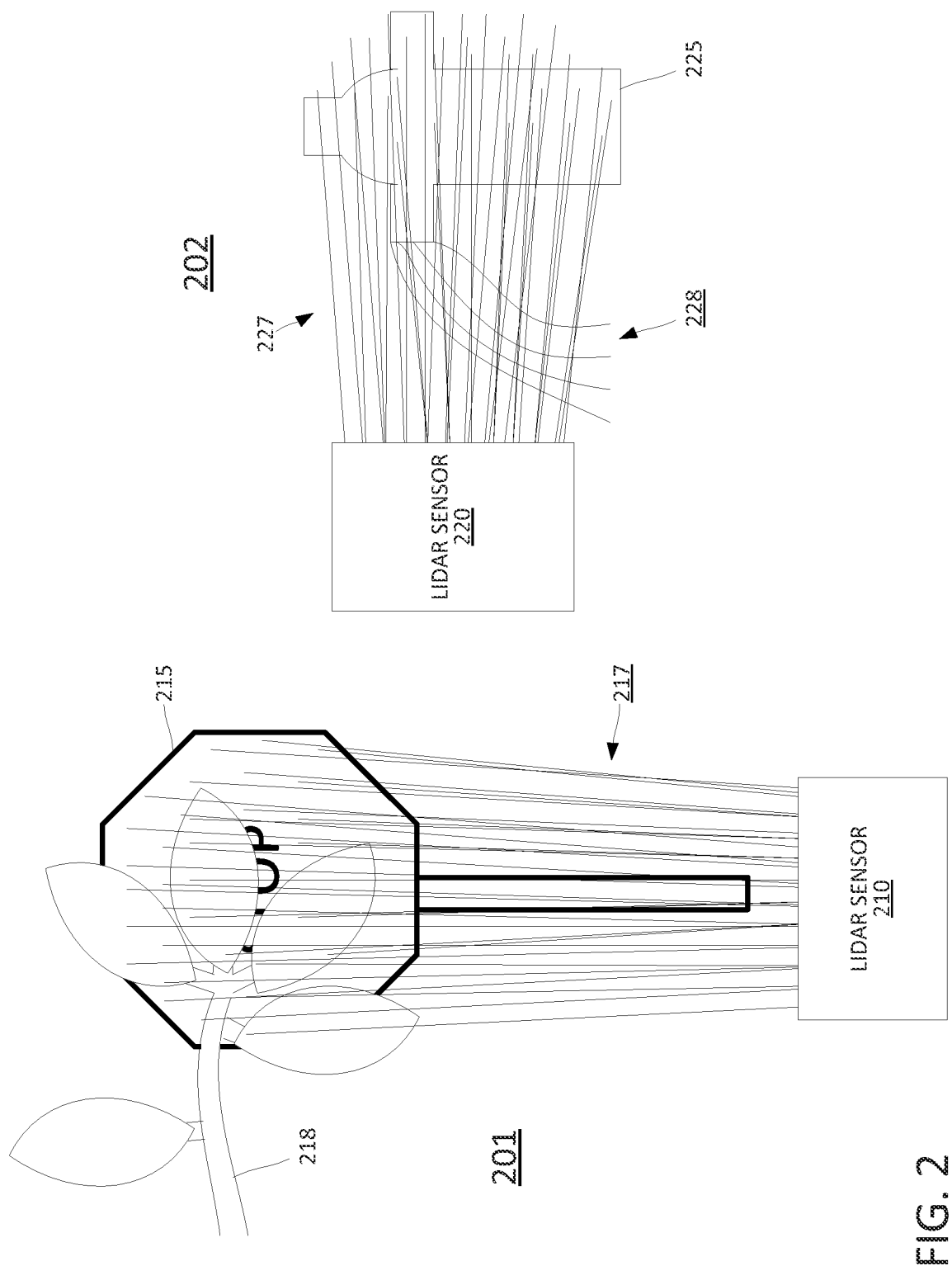
FIG. 2 illustrates examples of detecting potentially unsafe conditions of infrastructure items via LiDAR sensor data, in accordance with the present disclosure.

It should be noted that although examples are described above primarily with regard to images and or video captured via cameras, the present disclosure is equally applicable to LiDAR sensor data and/or radar sensor data (which may be considered as subsets of imaging data). For instance, examples of detecting unsafe conditions of infrastructure items in accordance with LiDAR sensor data are illustrated in FIG. 2 and discussed in greater detail below. In addition, other, further, and different examples of monitoring conditions of infrastructure items visible from a roadway may be addressed in accordance with the present disclosure. As just one additional example, server(s) 125, cameras, and/or other sensor devices may similarly analyze conditions of the lane markings of roadway 185 (e.g., similar to crosswalk 184), and likewise for parking lot markings, or the like. As another example, server(s) 125, cameras, and/or other sensor devices may similarly analyze conditions of storm sewer grates/drains, such as identifying grates that are blocked by debris, that are currently backed-up with water, and so forth. In still another example, server(s) 125, cameras, and/or other sensor devices may similarly analyze conditions of road surfaces, such as potholes, frost heaves, or the like. In addition, server(s) 125 may perform additional investigation of conditions of infrastructure items by providing more specific instructions to cameras or other sensor devices. For instance, to confirm an overgrown condition of STOP sign 182, server(s) 125 may gather additional images, LiDAR sensor data, etc., for different times of day, under different weather conditions, under different lighting conditions (such as for different natural light conditions, or by instructing mobile sensor devices to apply illumination to STOP sign 182 when capturing images, for example), and so on.

It should also be noted that the system 100 has been simplified. In other words, the system 100 may be implemented in a different form than that illustrated in FIG. 1. For example, the system 100 may be expanded to include additional networks, and additional network elements (not shown) such as wireless transceivers and/or base stations, border elements, routers, switches, policy servers, security devices, gateways, a network operations center (NOC), a content distribution network (CDN) and the like, without altering the scope of the present disclosure. In addition, system 100 may be altered to omit various elements, substitute elements for devices that perform the same or similar functions and/or combine elements that are illustrated as separate devices.

As just one example, one or more operations described above with respect to server(s) 125 may alternatively or additionally be performed by server(s) 112, and vice versa. In addition, although server(s) 112 and server(s) 125 are illustrated in specific deployments in the example of FIG. 1, in other, further, and different examples, the same or similar functions may be distributed among multiple devices within the telecommunication network 110, wireless access network 115, and/or the system 100 in general that may collectively provide a collaborative lighting service. Additionally, devices that are illustrated and/or described as using one form of communication (such as a cellular or non-cellular wireless communications, wired communications, etc.) may alternatively or additionally utilize one or more other forms of communication. Thus, these and other modifications are all contemplated within the scope of the present disclosure.

FIG. 2 illustrates examples of detecting potentially unsafe conditions of infrastructure items via LiDAR sensor data, in accordance with the present disclosure. In a first example 201, a LiDAR sensor 210 may scan an area of space containing a STOP sign 215, which may be overgrown with vegetation 218. For instance, the LiDAR sensor 210 may emit a series of laser pulses 217 and measure the time of return/time of flight for the pulses 217. If the STOP sign 215 were clear, it would be expected for LiDAR sensor 210 to detect a flat, uniform, and smooth octagonal surface comprising the STOP sign 215. However, as can be seen in FIG. 2, many of the pulses 217, or rays, fall upon leaves and other parts of the vegetation 218. As such, the LiDAR sensor 210 may detect additional surfaces in front of the STOP sign 215 comprising the leaves and other parts of the vegetation 218. In this case, the LiDAR sensor 210, or one or more servers receiving and interpreting the LiDAR sensor data, may determine that the STOP sign 215 is obstructed in some manner. In one example, the resolution may be sufficient to determine that the obstruction comprises vegetation 218 (e.g., by applying the LiDAR sensor data as input data to one or more detection models (e.g., one or more trained MLMs) via which vegetation may be specifically detected). As described in connection with the examples of FIG. 1, an alert may be generated when multiple sensors (e.g., a threshold number or percentage of sensors gathering data with regard to the STOP sign 215) all collect sensor data indicative of the same condition (e.g., the overgrown/unsafe condition). For instance, the LiDAR sensor 210 may gather sensor data from which it may be detected that STOP sign 215 is blocked by overgrown vegetation 218. However, it may be the case that a very strong breeze has caused a branch to bend significantly at the time that LiDAR sensor 210 gathers its measurements. As such, the aggregation over multiple sensor devices may prevent unnecessary dispatch of maintenance personnel to the location from such temporary condition. For instance, additional sensor data regarding STOP sign 215 gathered over the course of 24 hours may indicate that the measurements of LiDAR sensor 210 represent an outlier (e.g., due to an unusually strong breeze at the time of its measurements), and that the condition of STOP sign 215 is still "good/normal."

In a second example 202 illustrated in FIG. 2, a LiDAR sensor 220 may scan an area of space containing a fire hydrant 225, which may be open and discharging water 228. For instance, the LiDAR sensor 220 may emit a series of laser pulses 227 and measure the time of return/time of flight for the pulses 227. If the fire hydrant 225 were closed and in a normal, not-in-use condition, it would be expected for LiDAR sensor 220 to detect the regular contours of the shape of fire hydrant 225. However, as can be seen in FIG. 2, many of the pulses 227, or rays, fall upon the stream of water 228 discharged by the fire hydrant 225. As such, the LiDAR sensor 220 may detect additional surfaces adjacent to the fire hydrant 225 (where a detection model, object model, representative images, etc. of the fire hydrant 225 indicate that there should be free space all around the fire hydrant 225). In this case, the LiDAR sensor 220, or one or more servers receiving and interpreting the LiDAR sensor data, may determine that the fire hydrant 225 is in an open condition (e.g., an unsafe condition, since open fire hydrants may affect water pressure at other hydrants that may be needed for firefighting purposes). In one example, this particular condition may not need further investigation/ confirmation by way of multiple sensor devices. Rather, in one example, a single detection of fire hydrant 225 in an open condition may trigger an alert to be generated and/or an automated work order generated for dispatch of public works, public safety, for fire department personnel to address the situation and close the fire hydrant 225.

Figure 3:
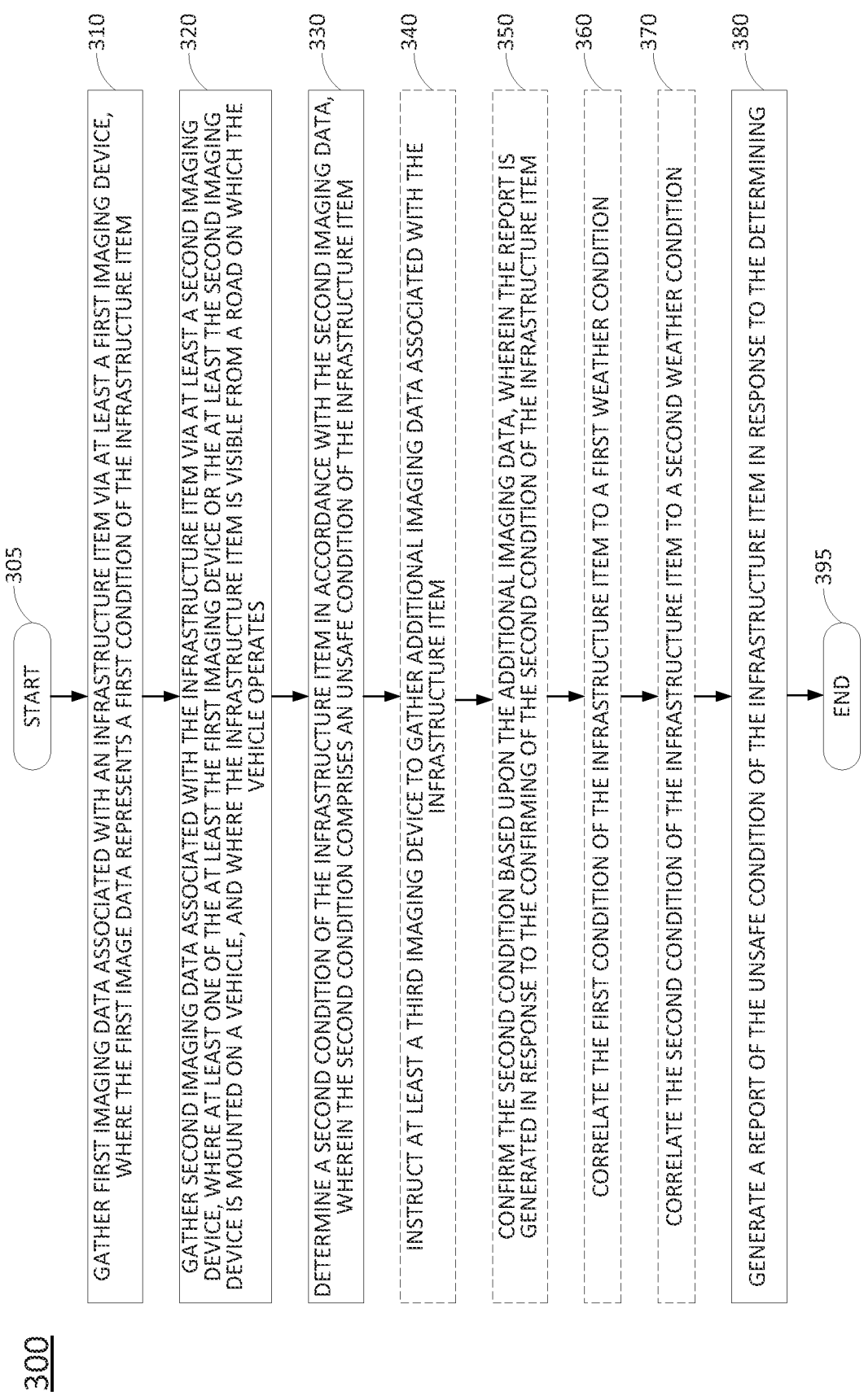
FIG. 3 illustrates a flowchart of an example method for determining a potentially unsafe condition of an infrastructure item in accordance with imaging data obtained from imaging devices, where at least one imaging device is deployed in a vehicle and where the infrastructure item is visible from a road on which the vehicle operates.

FIG. 3 illustrates a flowchart of an example method 300 for determining an unsafe condition of an infrastructure item in accordance with imaging data obtained from imaging devices, where at least one imaging device is deployed in a vehicle and where the infrastructure item is visible from a road on which the vehicle operates. In one example, steps, functions and/or operations of the method 300 may be performed by a device as illustrated in FIG. 1, e.g., by one or more of server(s) 125 and/or server(s) 112, or any one or more components thereof, such as a processing system. Alternatively, or in addition, the steps, functions and/or operations of the method 300 may be performed by a processing system collectively comprising a plurality of devices as illustrated in FIG. 1, such as server(s) 125 and/or server(s) 112, cameras 191-194, vehicle 140, AAV 160, and so forth. In one example, the steps, functions, or operations of method 300 may be performed by a computing device or processing system, such as computing system 400 and/or hardware processor element 302 as described in connection with FIG. 4 below. For instance, the computing system 400 may represent any one or more components of the system 100 that is/are configured to perform the steps, functions and/or operations of the method 300. Similarly, in one example, the steps, functions, or operations of the method 300 may be performed by a processing system comprising one or more computing devices collectively configured to perform various steps, functions, and/or operations of the method 300. For instance, multiple instances of the computing system 400 may collectively function as a processing system. For illustrative purposes, the method 300 is described in greater detail below in connection with an example performed by a processing system. The method 300 begins in step 305 and proceeds to step 310.

At step 310, the processing system gathers first imaging data associated with an infrastructure item via at least a first imaging device, wherein the first imaging data represents a first condition of the infrastructure item. For example, the at least one imaging device may comprise at least one of a camera, a LiDAR sensor, or a radar sensor. The infrastructure item may comprise, for example, a traffic sign, a street light or a path light, a fire hydrant, a utility pole, a power line, a telephone line, a cable line, or a road marking (which can include lane lines, line for where to stop at intersection, arrows indicating which lanes are for turning, proceeding straight, etc., crosswalks, indicators of bike lanes, bus lanes, or the like, parking lines, no parking zones, and so forth).

At step 320, the processing system gathers second imaging data associated with the infrastructure item via at least a second imaging device, where at least one of: the at least the first imaging device or the at least the second imaging device is mounted on a vehicle, and wherein the infrastructure item is visible from a road on which the vehicle operates. In one example, the at least the first imaging device may comprise at least a first camera and the at least the second imaging device may comprise at least a second camera. Alternatively, or in addition, the at least the first imaging device may comprise at least a first LiDAR sensor and the at least the second imaging device may comprise at least a second LiDAR sensor (and similarly for radar sensors). In one example, at least one of: the at least the first imaging device or the at least the second imaging device may comprise at least one of a mobile smartphone, an augmented reality (AR) headset, or an uncrewed aerial vehicle (UAV) (such as an AAV, or a remote-operated UAV). In one example, at least one of: the at least the first imaging device or the at least the second imaging device may comprise a fixed-location camera or LiDAR sensor (such as cameras 191-193 illustrated in FIG. 1).

It should be noted that as referred to herein "imaging data" may include digital images, video and/or video frames, may include infrared, ultraviolet or other imaging data not necessarily with respect to the human-visible spectrum light, may include spatial/imaging data from a LiDAR sensor or radar sensor, and so on. It should also be noted that although the terms, "first," "second," "third," etc., may be used herein, the use of these terms are intended as labels only. Thus, the use of a term such as "third" in one example does not necessarily imply that the example must in every case include a "first" and/or a "second" of a similar item. In other words, the use of the terms "first," "second," "third," and "fourth," does not imply a particular number of those items corresponding to those numerical values. In addition, the use of the term "third" for example, does not imply a specific sequence or temporal relationship with respect to a "first" and/or a "second" of a particular type of item, unless otherwise indicated. Similarly, as referred to herein, the terms "at least a first imaging device" and "at least a second imaging device" does not imply that these are necessarily different types of imaging devices, and so forth.

At step 330, the processing system determines a second condition of the infrastructure item in accordance with the second imaging data, where the second condition comprises a potentially unsafe condition of the infrastructure item. In one example, the second condition of the infrastructure item may be determined based upon a difference between the first imaging data and the second imaging data, e.g., using SSIM, PSNR, mutual information, and/or similar measures of the difference between the second imaging data and the first imaging data (e.g., one or more representative images from the first imaging data, a 2D or 3D model of the infrastructure item generated from and comprising part of the first imaging data, etc.). Broadly, the detected change has exceeded a threshold (e.g., either a fixed threshold or a dynamically changing threshold).

In one example, the second condition may be detected via one or more detection models (e.g., one or more trained MLMs) without direct comparison of the first and second imaging data, and without the MLM(s) necessarily being trained with the first imaging data. For example, a MLM may comprise a detection model for "fire hydrant" or "open fire hydrant" that is trained via images of fire hydrants that are not specifically the infrastructure item being analyzed e.g., the fire hydrant (although in one example it could be fully or partially trained on the first imaging data and could be particularized to the infrastructure item).

To further illustrate, in an example in which the infrastructure item comprises a fire hydrant, the second condition may comprise the fire hydrant in an open state, where the open state is detected in accordance with a machine learning-based detection model. Accordingly, the first condition may comprise the fire hydrant in a state of non-use, closed, or normal state. In one example, the machine learning-based detection model, e.g., a trained MLM, can be trained based on the first imaging data, but could be alternatively or additionally trained based on examples that are not specific to the particular fire hydrant. For instance, the detection model may be trained with positive or negative examples of open fire hydrants, depending on whether the model is trained to detect closed or open fire hydrants (e.g., if a binary classifier). In one example, a detection model could be a decision tree, a deep neural network (DNN), a recurrent neural network (RNN), a convolutional neural network (CNN) or the like, where an input (e.g., the second imaging data) may result in a classification into one of several output classes, e.g., "open fire hydrant," "closed fire hydrant," or "no fire hydrant." In one example, step 330 may include determining a confidence score of the detection of the second condition. For instance, a decision tree detection model may include a calculated confidence level of the output class, a score with regard to a binary classifier may comprise or may be proportional to a distance of a representative point in a hyperspace (e.g., a point representing the features of the second imaging data) from a class separation hyperplane, and so forth.

To further illustrate, in an example in which the infrastructure item comprises a street light or a path light, the second condition may comprise the street light or the path light being in a non-illuminated state, where the non-illuminated state is detected in accordance with a machine learning-based detection model. For instance, the second sensor data may comprise input data to an MLM for detecting either a street light/path light in an "illuminated" condition (e.g., "on") or in a "non-illuminated" condition (e.g., "off" or "out"), or both. In one example, such a detection model may be trained based on the first imaging data and/or can be trained with examples that are not specific to the particular street light (e.g., the first imaging data may represent positive examples of the street light or path light in an illuminated state such that the detection model is for detecting street lights that are "illuminated"). Accordingly, the first state may be that the street light or path light is illuminated/on. As such, the second imaging data may comprise a negative example representing the street light or path light in a "non-illuminated" condition. In addition, in one example, the determination of the first condition and the determination of the second condition may be with regard to data collected only during certain times (e.g., at night, or during times that street lights or path lights are supposed to be on (e.g., twilight, dawn, etc.)).

In still another example in which the infrastructure item comprises a road marking, the second condition may comprise the road marking being undetectable to the second imaging device or the road marking being detected by the at least the second imaging device with a confidence level below a threshold. It should again be noted that the at least the second imaging device may include multiple second imaging devices. As such, in one example, the determination of the road marking being detected by the at least the second imaging device with a confidence level below a threshold may be averaged, aggregated, or otherwise measured with respect to the readings of these multiple second imaging devices. Notably, this example relies upon the AI/ML capabilities of the imaging devices themselves, which are tasked with detecting road markings for the primary purpose of navigating a vehicle or providing driver assistance.

In one example, the first condition may comprise a first confidence of determination of alphanumeric information of the infrastructure item, and the the second condition comprises a second confidence of determination of the alphanumeric information of the infrastructure item. For instance, there may be several vehicles that pass a speed limit sign or STOP sign which cannot interpret the alphanumeric data thereon. Thus, a change in condition/change in the safety status may be declared when, over a threshold duration of time, a threshold number or percentage of imaging devices similarly indicate that the confidence in the readability of the sign is below 85 percent, below 75 percent, etc. (e.g., 80 percent of imaging devices are in agreement over at least a 48 hour period, etc.). This example also relies upon the AI/ML capabilities of the imaging devices themselves reporting on whether a sign is or is not readable, and, if readable, the extent to which the sign is readable.

More generally, in one example, the second condition of the infrastructure item may be detected when the second imaging data is indicative of the second condition and is obtained via a threshold number or percentage of second imaging devices over a threshold period of time. In addition, in one example, the second condition may be determined in consideration of the different types of imaging devices. For instance, if a road sign is detectable via mobile computing devices of pedestrians, but not to vehicles passing on the street, it may be determined that the sign is most likely blocked by another vehicle that is parked. If this state/condition persists, it may be that vegetation is growing in such a way so as to block the sign from the street, but such that the sign is still visible to pedestrians, and so on. The road sign may also be erroneously oriented, e.g., impacted by a car in an accident, such that it is no longer oriented in a proper viewing angle.

At optional step 340, the processing system may instruct at least a third imaging device to gather additional imaging data associated with the infrastructure item. In one example, step 340 may include at least one of: instructing the at least the third imaging device to deploy to a location of the infrastructure item, or instructing the at least the third imaging device to orient in a direction of the infrastructure item.

At optional step 350, the processing system may confirm the second condition based upon the additional imaging data. In one example, optional steps 340 and 350 may be with respect a single third imaging device. For instance, the third imaging device may comprise a UAV that is directed to deploy to the location of the infrastructure item and capture images from several vantage points over a period of time. However, in another example, the at least the third imaging device may comprise multiple third imaging devices, where the second condition may be confirmed based upon all or a threshold percentage of the third imaging devices all providing additional imaging data that confirms the second condition (and/or independently confirming the second condition via the respective imaging data gathered by each of the third imaging devices). In one example, optional step 350 may include similar operations such as discussed above in connection with step 330 to determine the second condition (e.g., applying the additional imaging data to one or more detection models, comparing the additional imaging data to representative images, 2D or 3D object models, etc.). In one example, steps 310-330 may rely upon pervasive imaging devices present or transient in a managed area in which the infrastructure item is location which may happen to capture imaging data of infrastructure items in the regular course of operations, whereas optional steps 340 and 350 may involve specifically directing imaging devices to concentrate on the particular infrastructure item, either by changing orientation, by deploying to the particular location, or by making sure imaging devices that are passing the infrastructure item along planned routes are made active and will actively gather and share imaging data of the infrastructure item, e.g., cameras on vehicles are generally in the off state but can be activated when the vehicles are within or near the managed area.

At optional step 360, the processing system may correlate the first condition of the infrastructure item to a first weather condition.

At optional step 370, the processing system may correlate the second condition of the infrastructure item to a second weather condition. For instance, optional steps 360 and 370 may include accessing a weather data feed from a weather information service, where the weather data feed may include data indicative of the weather in a well-defined, standardized format, such as an Extensible Markup Language (XML)-based weather data feed indicating temperature, humidity, precipitation, and so forth with respect to particular geographic coordinates in two or three dimensions, and with regard to specific times. In addition, optional steps 360 and 370 may include annotating one or more records regarding the detection of the first condition via the first imaging data and the detection of the second condition via the second imaging data with the corresponding weather information for the date(s)/time(s) and the location of the infrastructure item. In one example, optional steps 360 and 370 may also include identifying two or more weather conditions experienced at the location of the infrastructure item over an extended time period for which the first imaging data and the second imaging data are collected, and then identifying the percentages of times that the first condition and/or the second condition are associated with each of the types of weather. In one example, when the first condition is associated with the first type of weather more than a threshold percentage of the time or for more than a threshold number of samples of the first and second imaging data, the first condition may be deemed "correlated" or "associated" with the first type of weather at optional step 360, and similarly for the correlation/association of the second condition with the second type of weather at optional step 370.

At step 380, the processing system generates a report of the unsafe condition of the infrastructure item in response to the determining (e.g., of step 330). In one example, the report may comprise an order to perform maintenance on or around the infrastructure item, e.g., to repair the infrastructure item, clean the infrastructure item, cut grass, shrubs, and/or trees on or around the infrastructure item, repaint, seal-coat, etc. In one example, the report is generated further in response to the confirming of the second condition of the infrastructure item at optional step 350. In one example, the report may include an indication of at least one of: the first condition of the infrastructure item being associated with the first weather condition or the second condition of the infrastructure item being associated with the second weather condition, e.g., as determined at optional steps 360 and 370.

Following step 380, the method 300 proceeds to step 395. At step 395, the method 300 ends.

It should be noted that the method 300 may be expanded to include additional steps, or may be modified to replace steps with different steps, to combine steps, to omit steps, to perform steps in a different order, and so forth. For instance, in one example the processing system may repeat one or more steps of the method 300 for additional time periods, for additional infrastructure items, and so forth. In one example, the method 300 may be expanded to include updating an infrastructure database for a new infrastructure item that is detected or changed in a location of an infrastructure item. In one example, the method 300 may further include determining which type of infrastructure item is expected at a location in accordance with an infrastructure database and deploying detection models or reference images for active use. For instance, instead of having multiple detection models active and in-use, it may be substantially more efficient to have only detection models, reference images, or the like be scanned for detecting conditions of infrastructure items that are expected to be present. To illustrate, it may be wasteful to apply the second imaging data to a detection model for an "open fire hydrant" if the second imaging device is gathering the second imaging data from a location of a street light, and where a fire hydrant is not expected to be at the location. In one example, the method 300 may include the processing system providing such information to mobile imaging devices and/or providing detection models, reference images, or the like which are specific to the infrastructure item(s) that are along prospective routes of the mobile imaging devices. For instance, the mobile imaging devices do not necessarily send the first and/or second imaging data to the processing system, but instead perform the detection of the condition(s) of the infrastructure item(s) locally and report the results to the processing system, if necessary.

In one example, step 380 may comprise or the method 300 may be expanded to add the step of providing useful information to vehicles or other users to expect certain conditions, such as "road markings expected to be poor in the following conditions . . . ," or "road markings expected to be poor on the following days . . . " For example, a driver may be advised to use increased vigilance or may deactivate a self-driving mode of a vehicle when it is expected that road markings may be hard for the vehicle to self-detect. In one example, the method 300 may be modified and/or expanded to utilize additional types of sensor devices and additional types of sensor data, such as gathering sensor data from microphones or vibration sensors, which may be used to detect changes in road conditions, e.g., indicative of potholes, potholes, bridge movement, and so forth. In one example, the method 300 may also comprise tracking that an infrastructure item comprising a road sign is undetectable or unreadable over a shorter period of time. For instance, multiple drivers may be issued citations for making a right turn on red, but it may be the case that the posted sign was not detectable to multiple vehicle's cameras, LiDAR sensors, and/or radar sensors. As such, a driver's claim that the driver was unaware that right turn on red is not permitted at a particular intersection may be supported by this objective data that the sign appears to have been blocked or otherwise unreadable at the time in question. Accordingly, the report of the unsafe condition generated at step 380 may also include information regarding the changing condition(s) of the sign at various times (e.g., for 5 minute increments over a 24 hour period, 10 minute increments, or the like). In various other examples, the method 300 may further include or may be modified to comprise aspects of any of the above-described examples in connection with FIGS. 1 and 2, or as otherwise described in the present disclosure. Thus, these and other modifications are all contemplated within the scope of the present disclosure.

In addition, although not expressly specified above, one or more steps of the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

FIG. 4 depicts a high-level block diagram of a computing device or processing system specifically programmed to perform the functions described herein. For example, any one or more components or devices illustrated in FIG. 1 or described in connection with the examples of FIGS. 2 and 3 may be implemented as the processing system 400. As depicted in FIG. 4, the processing system 400 comprises one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for determining a potentially unsafe condition of an infrastructure item in accordance with imaging data obtained from imaging devices, where at least one imaging device is deployed in a vehicle and where the infrastructure item is visible from a road on which the vehicle operates, and various input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the Figure, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor 402 can also be configured or programmed to cause other devices to perform one or more operations as discussed above. In other words, the hardware processor 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 405 for determining a potentially unsafe condition of an infrastructure item in accordance with imaging data obtained from imaging devices, where at least one imaging device is deployed in a vehicle and where the infrastructure item is visible from a road on which the vehicle operates (e.g., a software program comprising computer-executable instructions) can be loaded into memory 404 and executed by hardware processor element 402 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for determining a potentially unsafe condition of an infrastructure item in accordance with imaging data obtained from imaging devices, where at least one imaging device is deployed in a vehicle and where the infrastructure item is visible from a road on which the vehicle operates (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
   gathering, by a processing system including at least one processor, first imaging data associated with an infrastructure item via at least a first imaging device, wherein the first imaging data represents a first condition of the infrastructure item;
   gathering, by the processing system, second imaging data associated with the infrastructure item via at least a second imaging device, wherein at least one of: the at least the first imaging device or the at least the second imaging device is mounted on a vehicle, and wherein the infrastructure item is visible from a road on which the vehicle operates;
   determining, by the processing system, a second condition of the infrastructure item in accordance with the second imaging data, wherein the second condition comprises a potentially unsafe condition of the infrastructure item, wherein the determining is based upon a comparison of the second imaging data with the first imaging data;
   instructing, by the processing system, at least a third imaging device to deploy to a location of the infrastructure item to gather additional imaging data associated with the infrastructure item;

confirming, by the processing system, the second condition of the infrastructure item based upon the additional imaging data; and generating, by the processing system, a report of the potentially unsafe condition of the infrastructure item in response to the confirming of the second condition of the infrastructure item.

2. The method of claim 1, wherein the report comprises an order to perform a maintenance associated with the infrastructure item.

3. The method of claim 1, wherein the infrastructure item comprises a traffic sign.

4. The method of claim 1, wherein the infrastructure item comprises a street light or a path light.

5. The method of claim 4, wherein the second condition comprises the street light or the path light being in a non-illuminated state, and wherein the non-illuminated state is detected in accordance with a machine learning-based detection model.

6. The method of claim 1, wherein the infrastructure item comprises a fire hydrant.

7. The method of claim 6, wherein the second condition comprises the fire hydrant in an open state, and wherein the open state is detected in accordance with a machine learning-based detection model.

8. The method of claim 1, wherein the infrastructure item comprises a road marking.

9. The method of claim 8, wherein the second condition comprises the road marking being undetectable to the at least the second imaging device or the road marking being detected by the at least the second imaging device with a confidence level below a threshold.

10. The method of claim 1, wherein the second condition of the infrastructure item is detected when the second imaging data is indicative of the second condition and is obtained via a threshold number of the at least the second imaging device or a percentage of the at least the second imaging device over a threshold period of time.

11. The method of claim 1, wherein the at least the first imaging device comprises at least a first camera and the at least the second imaging device comprises at least a second camera.

12. The method of claim 1, wherein:
the at least the first imaging device comprises at least a first light detection and ranging sensor and the at least the second imaging device comprises at least a second light detection and ranging sensor; or
the at least the first imaging device comprises at least a first radar sensor and the at least the second imaging device comprises at least a second light radar sensor.

13. The method of claim 1, wherein at least one of: the at least the first imaging device or the at least the second imaging device comprises at least one of:
a mobile smartphone;
an augmented reality headset; or
an uncrewed aerial vehicle.

14. The method of claim 1, wherein the instructing further includes:
instructing the at least the third imaging device to orient in a direction of the infrastructure item.

15. The method of claim 1, wherein the first condition comprises a first state of growth associated with vegetation around the infrastructure item, and wherein the second condition comprises a second state of growth associated with the vegetation around the infrastructure item.

16. The method of claim 1, wherein the first condition comprises a first confidence of determination of alphanumeric information of the infrastructure item, and wherein the second condition comprises a second confidence of determination of the alphanumeric information of the infrastructure item.

17. The method of claim 1, further comprising:
correlating the first condition of the infrastructure item to a first weather condition; and
correlating the second condition of the infrastructure item to a second weather condition, wherein the report includes an indication of at least one of: the first condition of the infrastructure item being associated with the first weather condition or the second condition of the infrastructure item being associated with the second weather condition.

18. A non-transitory computer-readable medium storing instructions which, when executed by a processing system including at least one processor, cause the processing system to perform operations, the operations comprising:
gathering first imaging data associated with an infrastructure item via at least a first imaging device, wherein the first imaging data represents a first condition of the infrastructure item;
gathering second imaging data associated with the infrastructure item via at least a second imaging device, wherein at least one of the at least the first imaging device or the at least the second imaging device is mounted on a vehicle, and wherein the infrastructure item is visible from a road on which the vehicle operates;
determining a second condition of the infrastructure item in accordance with the second imaging data, wherein the second condition comprises a potentially unsafe condition of the infrastructure item, wherein the determining is based upon a comparison of the second imaging data with the first imaging data;
instructing at least a third imaging device to deploy to a location of the infrastructure item to gather additional imaging data associated with the infrastructure item;
confirming the second condition of the infrastructure item based upon the additional imaging data; and
generating a report of the potentially unsafe condition of the infrastructure item in response to the confirming of the second condition of the infrastructure item.

19. An apparatus comprising:
a processing system including at least one processor; and
a computer-readable medium storing instructions which, when executed by the processing system, cause the processing system to perform operations, the operations comprising:
gathering first imaging data associated with an infrastructure item via at least a first imaging device, wherein the first imaging data represents a first condition of the infrastructure item;
gathering second imaging data associated with the infrastructure item via at least a second imaging device, wherein at least one of the at least the first imaging device or the at least the second imaging device is mounted on a vehicle, and wherein the infrastructure item is visible from a road on which the vehicle operates;
determining a second condition of the infrastructure item in accordance with the second imaging data, wherein the second condition comprises a potentially unsafe condition of the infrastructure item, wherein the determining is based upon a comparison of the second imaging data with the first imaging data;

instructing at least a third imaging device to deploy to a location of the infrastructure item to gather additional imaging data associated with the infrastructure item;

confirming the second condition of the infrastructure item based upon the additional imaging data; and generating a report of the potentially unsafe condition of the infrastructure item in response to the confirming of the second condition of the infrastructure item.

20. The apparatus of claim 19, wherein the report comprises an order to perform a maintenance associated with the infrastructure item.

* * * * *